United States Patent
Hakola et al.

(10) Patent No.: US 12,010,727 B2
(45) Date of Patent: Jun. 11, 2024

(54) ENHANCING RACH OPERATION IN NEW RADIO UNDER RF EXPOSURE REQUIREMENTS

(71) Applicant: Nokia Technologies Oy, Espoo (FI)

(72) Inventors: Sami-Jukka Hakola, Kempele (FI); Jorma Kaikkonen, Oulu (FI); Timo Koskela, Oulu (FI); Lars Dalsgaard, Oulu (FI); Juha Karjalainen, Oulu (FI); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 483 days.

(21) Appl. No.: 17/439,710

(22) PCT Filed: Apr. 15, 2020

(86) PCT No.: PCT/FI2020/050241
§ 371 (c)(1),
(2) Date: Sep. 15, 2021

(87) PCT Pub. No.: WO2020/221957
PCT Pub. Date: Nov. 5, 2020

(65) Prior Publication Data
US 2022/0167422 A1 May 26, 2022

Related U.S. Application Data

(60) Provisional application No. 62/842,489, filed on May 2, 2019.

(51) Int. Cl.
*H04W 74/08* (2024.01)
*H04L 5/00* (2006.01)
(Continued)

(52) U.S. Cl.
CPC ....... *H04W 74/0833* (2013.01); *H04L 5/0048* (2013.01); *H04W 52/367* (2013.01); *H04W 74/006* (2013.01)

(58) Field of Classification Search
CPC .......... H04W 74/0833; H04W 52/367; H04W 74/006; H04W 72/23; H04W 52/42;
(Continued)

(56) References Cited

U.S. PATENT DOCUMENTS

2014/0369394 A1   12/2014   Ruuska et al.
2018/0278318 A1   9/2018   Chakraborty et al.
(Continued)

FOREIGN PATENT DOCUMENTS

CA    2347071 A1    11/2002

OTHER PUBLICATIONS

Extended European Search Report received for corresponding European Patent Application No. 20799261.1, dated Nov. 1, 23, 2022, 9 pages.
(Continued)

*Primary Examiner* — Hoang-Chuong Q Vu
(74) *Attorney, Agent, or Firm* — Robert P. Michal, Esq.; Carter, DeLuca & Farrell LLP

(57) ABSTRACT

A technique of accounting for the difference in required output power reduction or required duty cycle when selecting the RO in addition to the DL RS. Both output power reduction and duty cycle are independently determined by UE itself (i.e., UE needs to be able to determine itself required power backoff and/or duty cycle in order to meet RF exposure requirements). Advantageously, a RACH procedure in which the UE determines both output power reduction and duty cycle independently enables better choices of output power reduction and duty cycle, enhancing data activity and coverage.

16 Claims, 6 Drawing Sheets

(51) Int. Cl.
*H04W 52/36* (2009.01)
*H04W 74/00* (2009.01)
*H04W 74/0833* (2024.01)

(58) Field of Classification Search
CPC .... H04W 72/02; H04L 5/0048; H04B 7/0695; H04B 17/327
See application file for complete search history.

(56) References Cited

U.S. PATENT DOCUMENTS

| | | | |
|---|---|---|---|
| 2018/0310257 A1 | 10/2018 | Papasakellariou | |
| 2019/0200365 A1* | 6/2019 | Sampath | H04B 17/318 |
| 2020/0112926 A1 | 4/2020 | Laghate et al. | |
| 2020/0280926 A1* | 9/2020 | Piipponen | H04W 52/16 |
| 2020/0367225 A1* | 11/2020 | Papaleo | H04W 72/52 |
| 2021/0021325 A1* | 1/2021 | Davydov | H04W 24/10 |
| 2021/0029652 A1* | 1/2021 | Li | H04W 52/365 |
| 2021/0044343 A1* | 2/2021 | Onggosanusi | H04B 7/0695 |
| 2021/0297959 A1* | 9/2021 | Zhou | H04W 72/0453 |
| 2021/0298083 A1* | 9/2021 | Taherzadeh Boroujeni | H04L 5/001 |
| 2022/0377681 A1* | 11/2022 | Comsa | H04B 17/24 |
| 2022/0386381 A1* | 12/2022 | Chitti | H04W 74/004 |
| 2023/0032007 A1* | 2/2023 | Ali | H04B 7/0695 |
| 2023/0065305 A1* | 3/2023 | He | H04W 52/367 |

OTHER PUBLICATIONS

"3rd Generation Partnership Project; Technical Specification Group Radio Access Network; NR; User Equipment (UE) radio transmission and reception; Part 2: Range 2 Standalone (Release 15)", 3GPP TS 38.101-2, V15.5.0, Mar. 2019, pp. 1-142.

International Search Report and Written Opinion received for corresponding Patent Cooperation Treaty Application No. PCT/FI2020/050241, dated Oct. 27, 2020, 17 pages.

"On FR2 RF Exposure mitigation methods", 3GPP TSG RAN WG1 Meeting #96bis, R1-1905229, Agenda: 5, Nokia, Apr. 8-12, 2019, 3 pages.

"Decoupling DL and UL beam selection", 3GPP TSG RAN WG1 Meeting #93, R1-1807189, Agenda: 7.1.2.2.6, Nokia, Apr. 21-25, 2018, 2 pages.

* cited by examiner

ENHANCING RACH OPERATION IN NEW RADIO UNDER RF EXPOSURE REQUIREMENTS

RELATED APPLICATION

This application was originally filed as PCT Application No. PCT/FI2020/050241 on Apr. 15, 2020, which claims priority from U.S. Provisional Application No. 62/842,489, filed on May 2, 2019, which is hereby incorporated in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE), uplink (UL) resource information from a network describing a plurality of UL resources; determining, by the UE after receiving the UL resource information and for at least one of the plurality of UL resources, restrictions on the UE resources associated with that UL resource; selecting, by the UE, at least one of the plurality of UL resources based on the restrictions on the UE resources associated with the at least one of the plurality of UL resources; and transmitting, by the UE, data using the at least one of the plurality of selected UL resources.

According to an example implementation, an apparatus includes at least memory and controlling circuitry coupled to the memory, the controlling circuitry being configured to receive uplink (UL) resource information from a network describing a plurality of UL; determine, after receiving the UL resource information and for at least one of the plurality of UL resources, restrictions on the UE resources associated with that UL resource; select at least one of the plurality of UL resources based on the restrictions on the UE resources associated with the at least one of the plurality of UL resources; and transmit data using the at least one of the plurality of selected UL resources.

According to an example implementation, an apparatus includes means for receiving uplink (UL) resource information from a network describing a plurality of UL resources; means for determining, after receiving the UL resource information and for at least one of the plurality of UL resources, restrictions on the UE resources associated with that UL resource; means for at least one of the plurality of UL resources based on the restrictions on the UE resources associated with the at least one of the plurality of UL resources; means for transmitting data using the at least one of the plurality of selected UL resources.

According to an example implementation, a computer program product includes a computer-readable storage medium and storing executable code that, when executed by at least one data processing apparatus, is configured to cause the at least one data processing apparatus to receive uplink (UL) resource information from a network describing a plurality of UL; determine, after receiving the UL resource information and for at least one of the plurality of UL resources, restrictions on the UE resources associated with that UL resource; select at least one of the plurality of UL resources based on the restrictions on the UE resources associated with the at least one of the plurality of UL resources; and transmit data using the at least one of the plurality of selected UL resources.

The details of one or more examples of implementations are set forth in the accompanying drawings and the description below. Other features will be apparent from the description and drawings, and from the claims.

DETAILED DESCRIPTION

Figure 1:
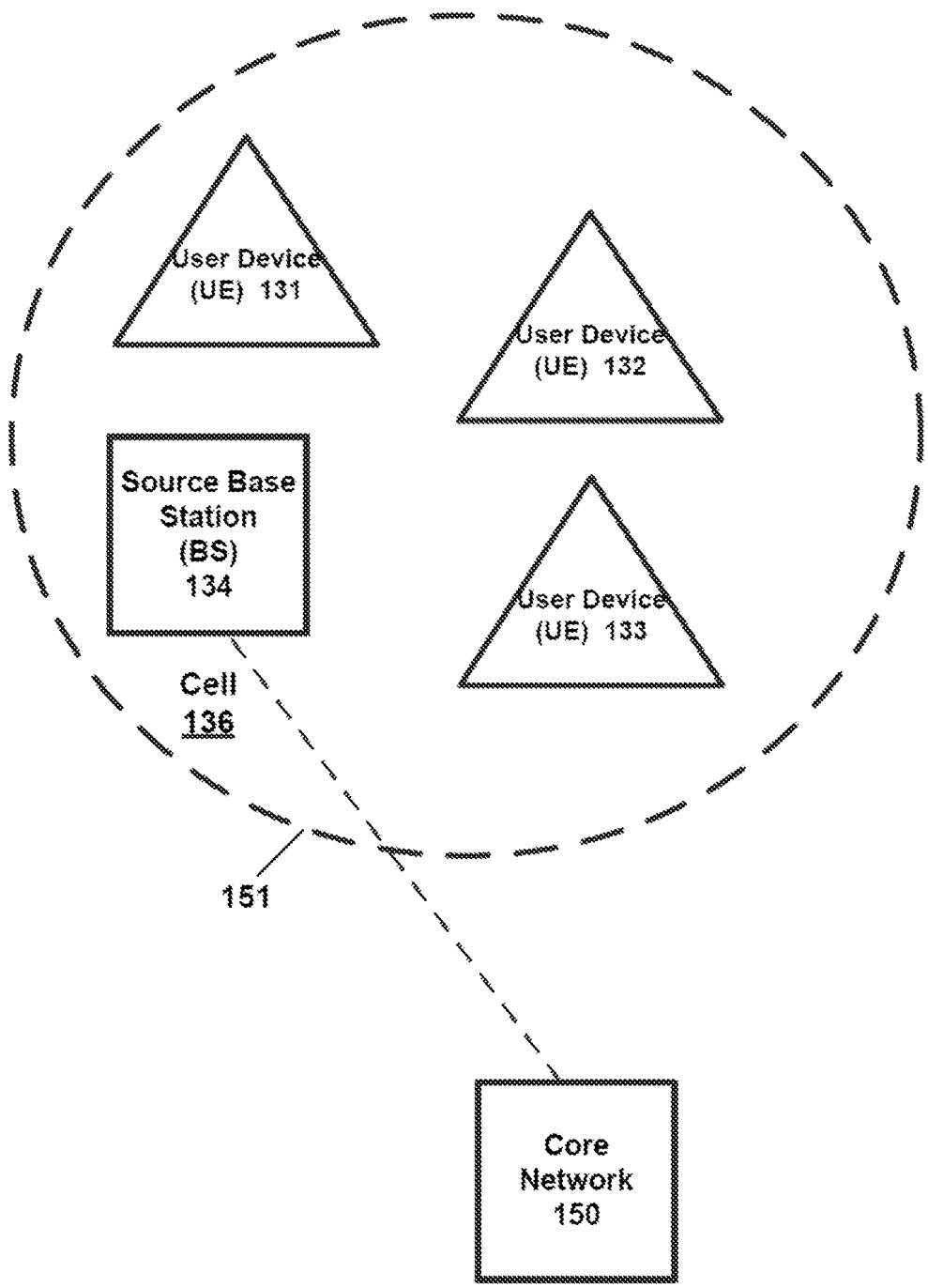
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

A random access procedure (e.g., RACH) is used by user equipment (UE) in an idle or inactive or connected states to access a network, for example to request a setup of a connection. Implementing a RACH includes a four-step procedure ("four-step RACH"). 1) Step 1 (Msg1) includes a transmission of a preamble, i.e., a physical RACH (PRACH), from the UE to a base station (gNB). 2) Step 2 (Msg2) includes a transmission of a random access response (RAR) from the gNB to the UE. 3) Step 3 (Msg3) includes a scheduled transmission of data from the UE to the gNB. 4) Step 4 (Msg4) includes a transmission of a contention resolution from the gNB to the UE.

Some UEs implement a RACH procedure that takes emission factors into account in the form of a Maximum Permittable Exposure (MPE). In frequency range 2 (FR2), the MPE requirement is highly directional because of "beam" based operation at the UE. The UE is equipped typically with multiple antenna panels each having multiple antenna elements for generating beams for transmission and reception. NB frequency range 1 (FR1) is determined in TS38.101 as frequency range from 450 MHz to 6000 MHz. Correspondingly, in TS38.101, frequency range 2 (FR2) is determined as a frequency range from 24250 MHz to 52600 MHz.

To ensure compliance with applicable electromagnetic energy absorption requirements and addressing unwanted emissions RAN4 (Radio performance and protocol aspects (system)—RF parameters and BS conformance working group) has agreed so far two approaches. The first approach involves using allowed maximum output power reduction (P-MPR) and the second approach involves using uplink duty cycle. However, use of both approaches impact uplink performance negatively. To address this, the UE capability maxUplinkDutyCycle was approved where the capability allows the UE to signal its preferred maximum UL duty cycle to the network.

NR supports receive beamforming for PRACH preamble reception by allocating multiple RACH occasions (ROs) for which the gNB may use different receive beams. PRACH occasion and PRACH preamble selection by the UE also signals the preferred SS/PBCH (physical broadcast channel) block beam that will be used for Msg2 and Msg4 transmissions.

The allocation is done by configuring an association between an SS/PBCH block and one or more RACH occasion(s) and set of PRACH preambles within each associated occasion. Based on the DL measurements on SS/PBCH block(s), in a conventional RACH procedure, the UE determines the RACH occasions and PRACH preambles within the occasions associated to the selected SS/PBCH block from which the UE selects the preamble for the transmission. Current specification allows UE, in CBRA (contention-based random access) to select RACH Occasions corresponding to any SSB which RSRP (reference signal received power) exceeds the configured threshold (e.g., rsrp-ThresholdSSB). Correspondingly, in case of CFRA (contention-free random access), UE can select any SSB (or CSI-RS) from the configured candidate list (candidateBeamRSList) that exceeds the configured threshold.

Nevertheless, for example in FR2 the UE is typically assumed to be equipped with multiple antenna panels, and the UE operates both in downlink and uplink using beams that are narrower than omni-direction beams typically assumed to be used in FR1 per antenna. When operating with the beams in uplink, a common output power reduction and/or duty cycle is not feasible to be applied because different beams have different conditions what comes to the RF exposure issue: some beams may propagate towards a human body while some other beams not. The former would require higher output power reduction and/or lower duty cycle than the latter.

It is noted that, in some implementations, amount of output power reduction is determined based on the maximum output power that can be used for UL transmission within a certain time, ensuring compliance with applicable electromagnetic energy absorption requirements. In some implementations, the amount of output power reduction is determined autonomously by the UE 240 assuming that the UE 240 is transmitting continuously on UL resources, a certain portion of UL resources from certain antennae, antenna panels, or beams.

It is noted that, in some implementations, the duty cycle, i.e., the UL duty cycle is determined as the highest portion of UL symbols than can used for UL transmission within a certain time and ensure compliance with applicable electromagnetic energy absorption requirements. In some implementations, the UL duty cycle is determined autonomously by the UE 240 assuming that the UE 240 would be transmitting at its maximum output power, within a certain range from the maximum output power from certain antennae, antenna panels, or beams.

Correspondingly in the above-described conventional RACH procedure, selecting RO based on the DL measurements (e.g., based on SS/PBCH block or CSI-RS), may not give the desired outcome from the perspective of MPE targets if done solely based on the DL RS RSRP. This may lead to undesirably large output power reduction or small duty cycle, hindering the data activity or coverage.

In contrast to the above-described conventional RACH procedure, an improved technique includes accounting for the difference in required output power reduction or required duty cycle when selecting the RO in addition to the DL RS. Both output power reduction and duty cycle are independently determined by UE itself (i.e., UE needs to be able to determine itself required power backoff and/or duty cycle in order to meet RF exposure requirements). Advantageously, a RACH procedure in which the UE determines both output power reduction and duty cycle independently enables better choices of output power reduction and duty cycle, enhancing data activity and coverage.

Figure 2:
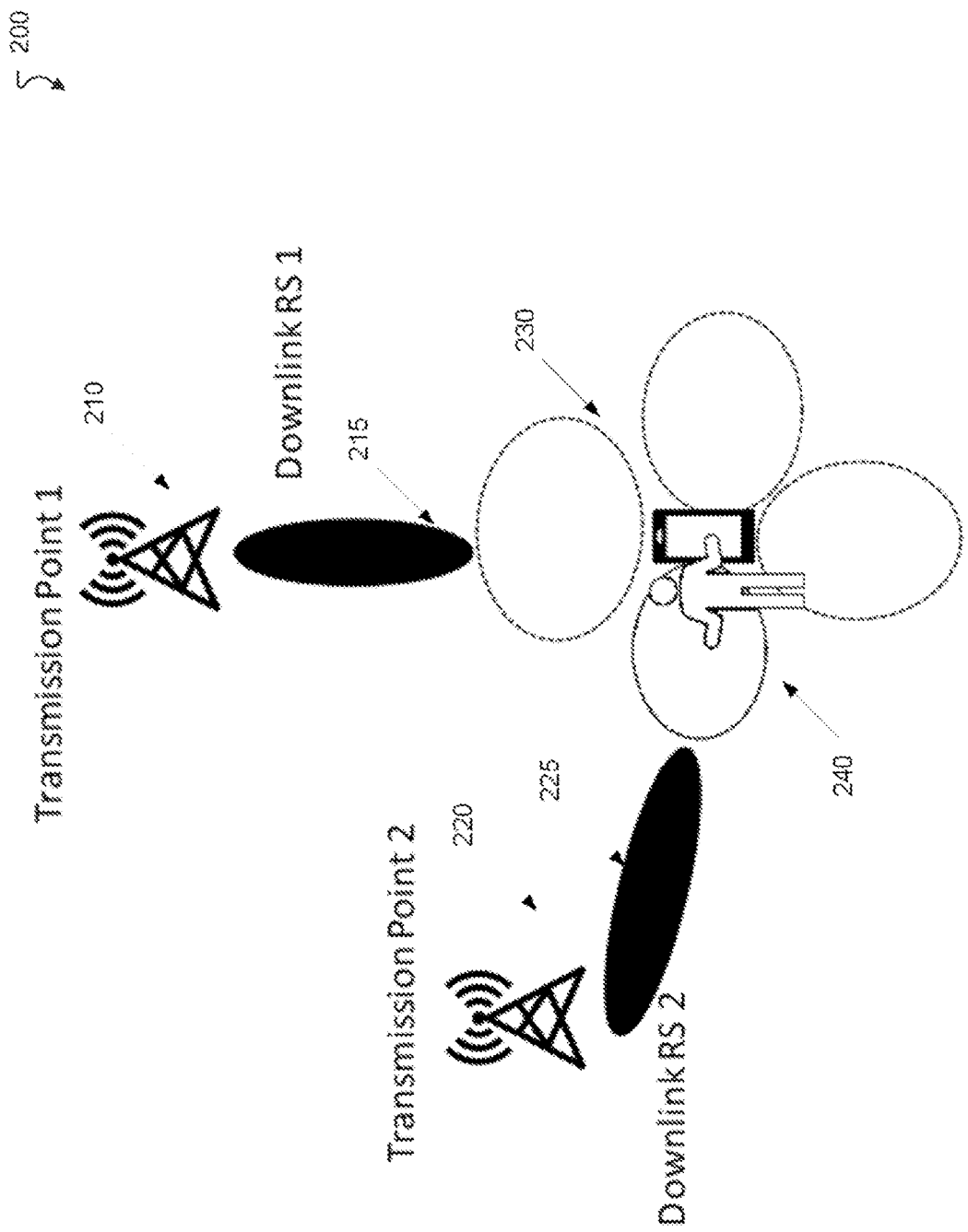
FIG. 2 is a diagram illustrating a multi-beam environment according to an example implementation.

FIG. 2 is a diagram illustrating a multi-beam environment 200. In the environment 200, a UE 240 receives UL resource information from a gNB at transmission points 210 and 220, each of which produce DL RSs 215 and 225, respectively. In the convention RACH approach, the UE 240 performs a measurement of the DL RSRP for each of the DL RSs 215 and 225 and selects UL resources based on the measurement. In contrast, the UE 240 determines restrictions on UE resources (e.g., signal power) for each of the plurality of UL resources that might affect the selection of the UL resource over which the UE 240 transmits data. The UL has a plurality of antennae, each of which corresponds to one of the DL RSs 215 and 225 and the UL beams 230.

As shown in FIG. 2, there are several UL beams 230, each having a different direction. Some of the UL beams 230 are directed away from the user 242 and some UL beams 230 are directed toward the user 242. In this case, the UL beams 230 directed away from the user 242 should be able to use a larger power in transmission than those directed toward the user 242.

As shown in FIG. 2, the UL resources are associated with an UL beam 230. For example, in some implementations, each beam 230 is associated with a physical uplink shared channel (PUSCH) resource and a preamble. In some implementations, the UE 240 determines a output power reduction via a power determination operation. In such a power determination operation, in some implementations, the UE 240 generates a respective output power reduction for each of the DL RSs 215 and 225. In some implementations, the output power reduction associated with a DL RS is determined based on how much of that DL RS passes through or is absorbed by the user 240. In such implementations, the UE 240 uses sensors to determine the proximity of the UE 240 to a head or other part of the user 242. Once the output power reduction for each DL RS is determined, the UE 240 then adjusts the respective RSRP associated with each DL RS to form a respective adjusted RSRP associated with that RSRP. In some implementations, adjusting includes subtracting the applied output power reduction from the RSRP.

The UE 240 then selects a DL RS which adjusted RSRP is above a threshold power. In some implementations, the threshold power is defined in a specification. In some implementations, the threshold power is defined by the network. In some implementations, the network sends a specification of the threshold power with the UL resource information via the gNB.

In some implementations, the UE 240 determines a minimum duty cycle for each of the DL RSs. In some implementations, this minimum duty cycle is found independently of the output power reduction, although that duty cycle is found based on MPE requirements concerning exposure to radiation. Because the beams interact differently with the user with regard to the MPE requirements concerning exposure to radiation, it is unlikely that a common output power reduction and duty cycle across the DL RSs is achievable. In some implementations, the UE 240 selects a DL RS based on the largest duty cycle greater than the minimum duty cycle.

In some implementations, when no adjusted RSRP is greater than the threshold power, the UE selects a RS associated with the largest duty cycle.

The UE 240 maps the DL RS, the output power reduction, and the duty cycle to a RACH occasion (RO). In some implementations, the UE 240 ranks the ROs corresponding to a DL RS that exceeds the power threshold based on a required duty cycle so that the RO corresponding to the DL RS with the highest duty cycle is prioritized. In some implementations, this RSRP power threshold evaluation may also be based on a required output power reduction.

In some implementations, only those ROs for which the required duty cycle is greater than a defined duty cycle threshold may be considered or prioritized in a RACH RO selection. In some implementations, if the duty cycle threshold cannot be met without MPR for any DL RS, then the UE 240 may select a DL RS with the lowest MPR.

In some implementations, a network may indicate (e.g., in system information together with RACH resource provisioning or using dedicated signalling) a selection of how the UE 240 should prioritize the RO selection. That is, the network may indicate the DL RS for which the smallest output power reduction can be met (regardless of the duty cycle), i.e., to prioritize coverage, or for which largest duty cycle can be used (e.g., 100%) regardless the required output power reduction i.e., to prioritize scheduling flexibility.

In some implementations, different ROs or UL resources may be configured for different allowed/tolerated output power reduction or duty cycle levels. This may enable the network to be aware of and account for MPE-related limitations correctly from the start. In some implementations, for certain UL resources, a maximum output power reduction threshold or minimum duty cycle limit is defined.

In some implementations, the above-described RACH procedure is triggered due to the UE 240 reaching the maximum output power reduction threshold for at least one, for a subset, or for all UL beams.

In some implementations, the above-described RACH procedure is triggered due to the UE 240 reaching the minimum duty cycle limit. That is, for example, the duty cycle due to MPE requirements falls below the limit, where the limit may be 60%, 70%, 80%, 90%, or 100%.

In some implementations, when the maximum MPR threshold/duty cycle minimum is reached, the UE 240 may trigger beam failure recovery on CFRA beams where UE excludes the CFRA candidates with duty cycle below limit value. In some implementations, reaching any of these limits indicates a duty cycle value or a duty cycle limit associated with the selected SSB/CSI-RS in the RACH procedure.

In some implementations, if the UE has a valid C-RNTI, then the UE 240 includes the C-RNTI in Msg3 of the (4-step) RACH procedure.

In some implementations, for output power reduction the UE 240 reduces transmission power by 2 dB to meet the MPE limits. In some implementations, for duty cycle the UE 240 restricts its transmission to 50% of time over 10 ms time period to meet the MPE limits.

It is noted that, for lower frequency bands (e.g., <3 GHz), the MPE limits may be set by a specific absorption rate (SAR), which determines RF power absorbed by certain mass (of living body like material) (units of W/kg). For above 6 GHz, the MPE limits are directed to the maximum incident power density (W/m^2) measured/averaged over certain area (e.g., 20 cm^2).

Based on the used antenna or antennae array gain, the maximum allowed transmission power to meet the MPE limit is also determined by a given distance. In some implementations, distance is determined by the aforementioned requirements and an antenna/antennae array gain from a given device implementation.

Hence the above-noted requirements can be used to determine the allowed maximum transmission power to meet the emission limits e.g., when certain objects are within a certain distance. This then can be used to determine the power back-off (P-MPR, MPR) as a separation of actual maximum transmission power capability of the UE and the maximum allowed transmission power to meet the MPE limits. Alternatively, when the emission is determined over a certain time period, one can determine a required time domain restriction of the transmission power to meet the MPE limits.

Figure 3:
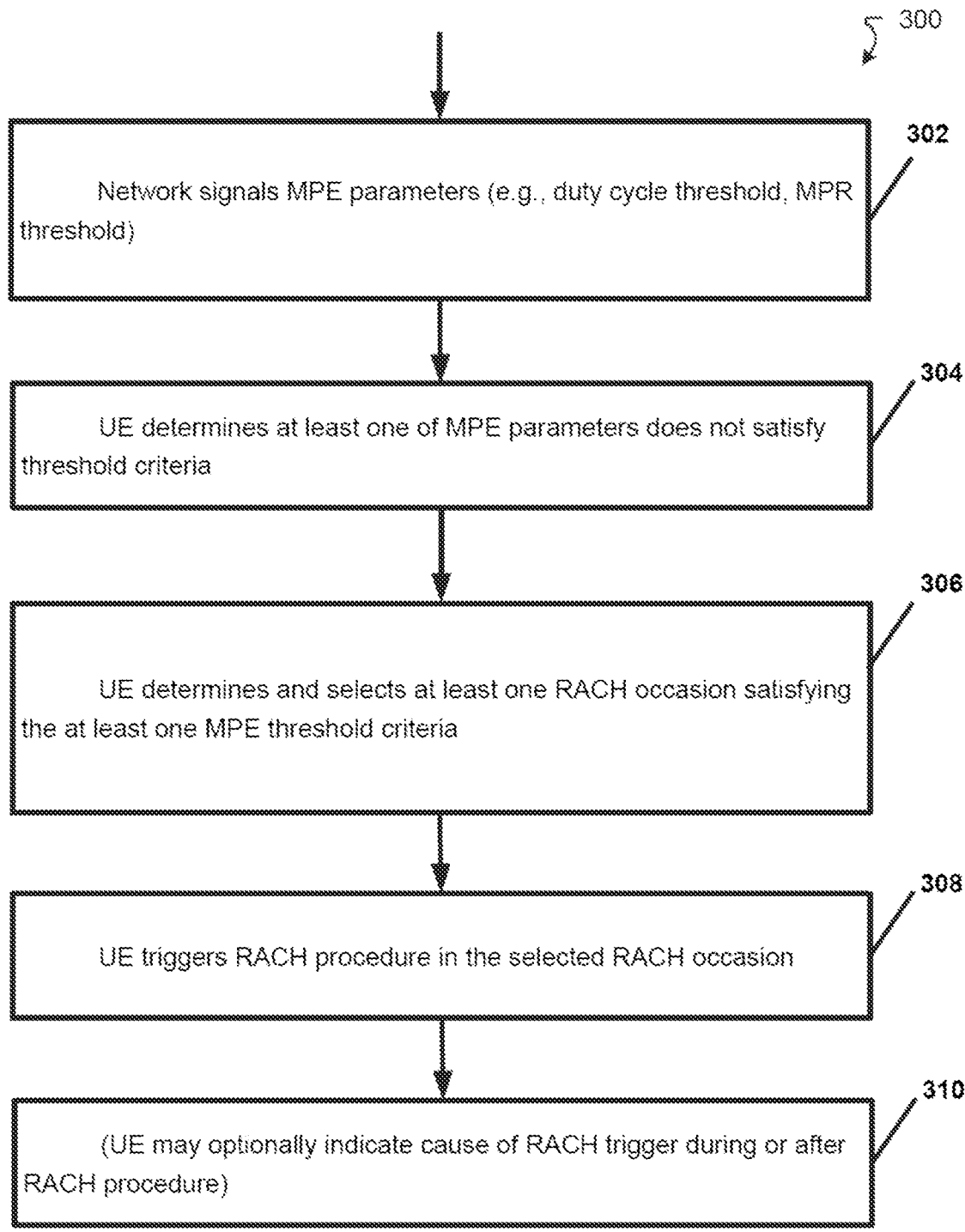
FIG. 3 is a flow chart illustrating a UE operation based on network-provided MPE-related parameters according to an example implementation.

FIG. 3 is a flow chart illustrating a UE operation 300 based on network-provided MPE-related parameters in an example implementation.

At 302, the network sends a signal containing data representing MPE parameters, including the duty cycle threshold and the MPR threshold.

At 304, the UE determines at least one of the MPE parameters does not satisfy the threshold criteria, e.g., that the MPR is greater than the threshold or the duty cycle is less than the threshold.

At 306, the UE selects at least one RO that satisfies the MPE threshold criteria, e.g., that the emissions exposure is smaller than the MPE.

At 308, the UE triggers the RACH procedure on the selected RO.

At 310, in some implementations, the UE indicates the trigger during or after the RACH procedure.

Figure 4:
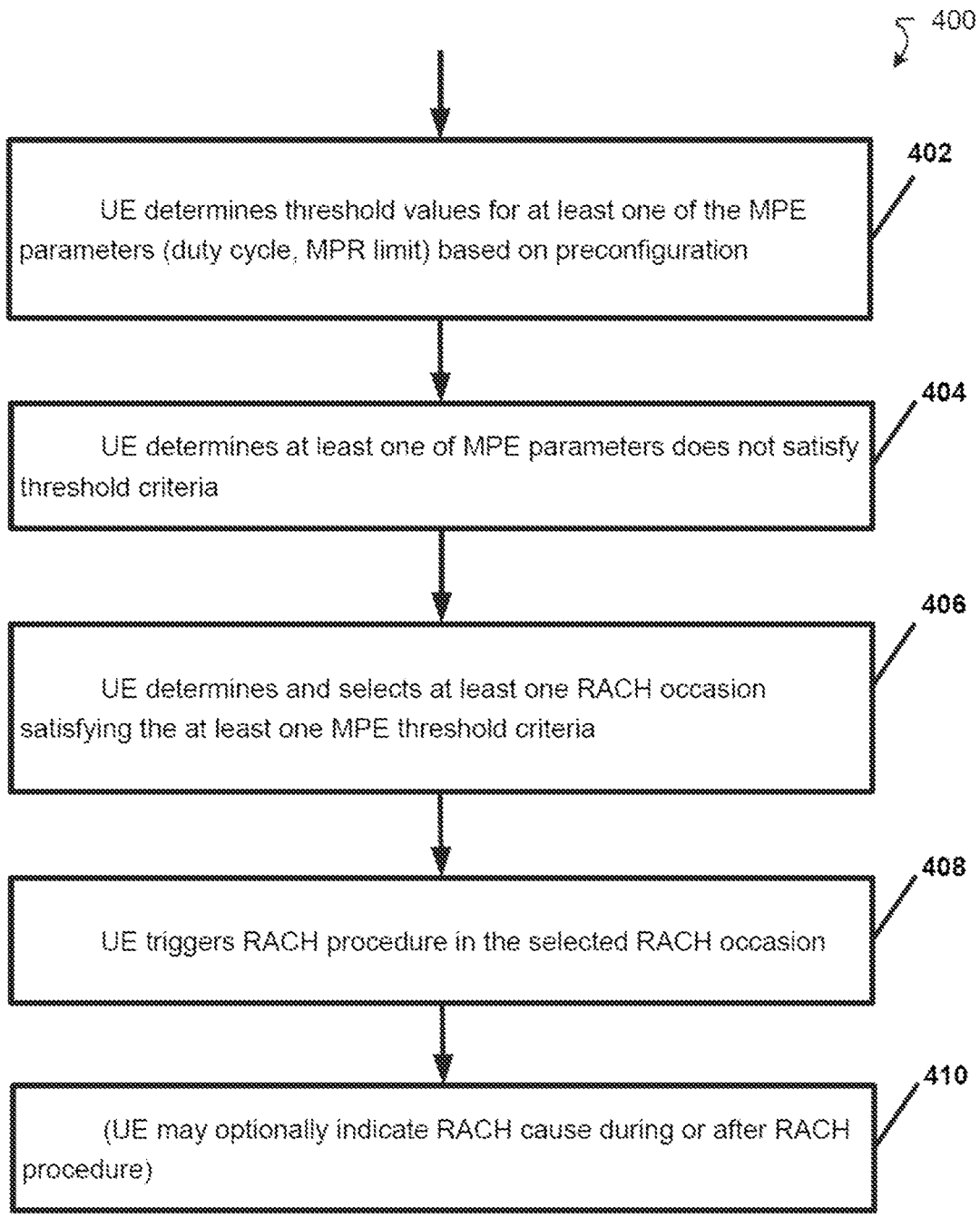
FIG. 4 is a flow chart illustrating a UE operation based on preconfigured MPE-related parameters according to an example implementation.

FIG. 4 is a flow chart illustrating a UE operation 400 based on preconfigured MPE-related parameters in an example implementation.

At 402, the UE determines the threshold values for the MPE parameters, including the duty cycle threshold and the MPR threshold.

At 404, the UE determines at least one of the MPE parameters does not satisfy the threshold criteria, e.g., that the MPR is greater than the threshold or the duty cycle is less than the threshold.

At 406, the UE selects at least one RO that satisfies the MPE threshold criteria, e.g., that the emissions exposure is smaller than the MPE.

At 408, the UE triggers the RACH procedure on the selected RO.

At 410, in some implementations, the UE indicates the trigger during or after the RACH procedure.

Figure 5:
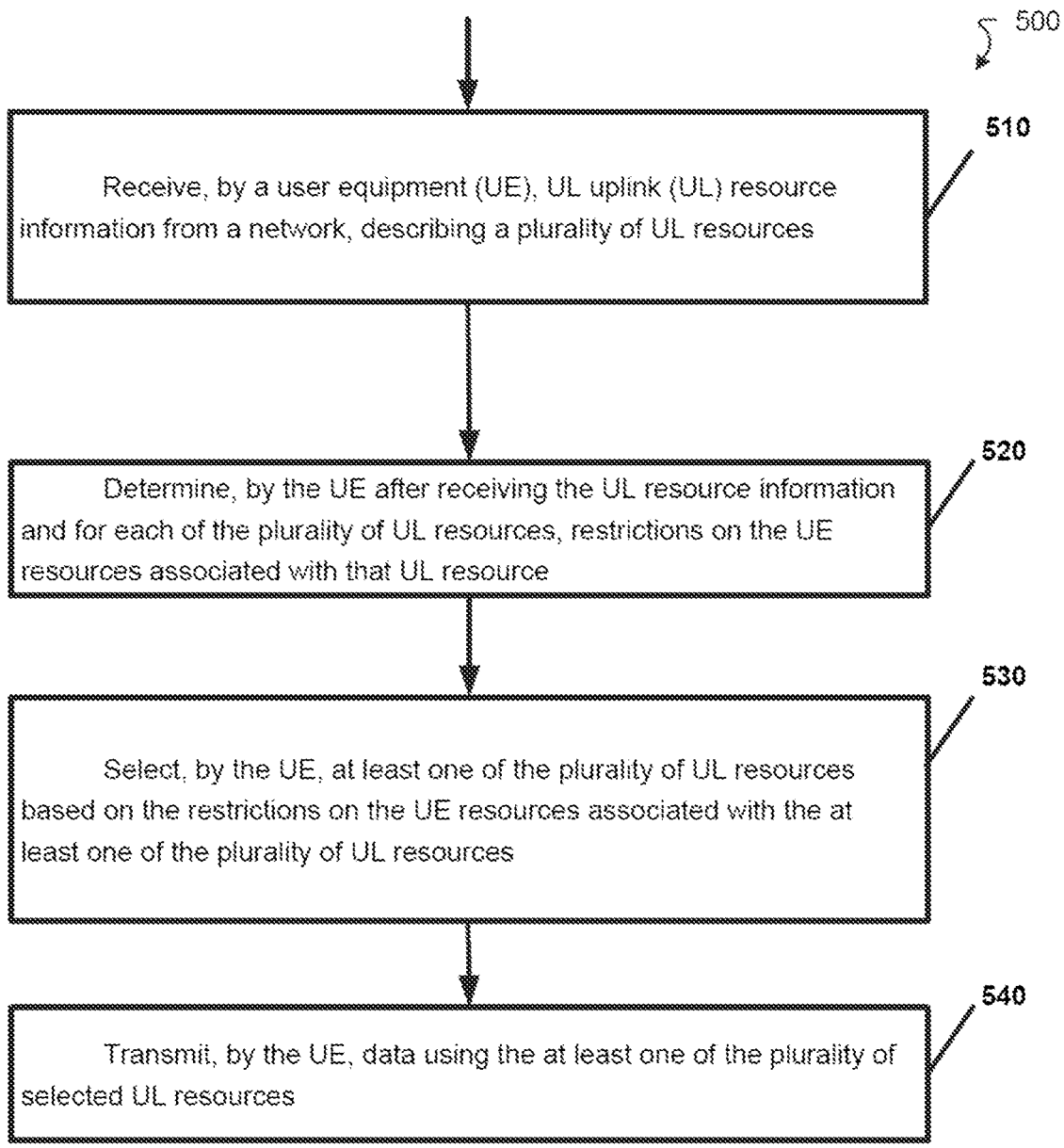
FIG. 5 is a flow chart illustrating a method of enhancing RACH operation in NR under RF exposure requirements according to an example implementation.

Example 1: FIG. 5 is a flow chart illustrating an example method 500 of performing the improved techniques. Operation 510 includes receiving, by a user equipment (UE), uplink (UL) resource information from a network describing a plurality of UL resources. Operation 520 includes determining, by the UE after receiving the UL resource information and for at least one of the plurality of UL resources, restrictions on the UE resources associated with that UL resource. Operation 530 includes selecting, by the UE, at least one of the plurality of UL resources based on the restrictions on the UE resources associated with the at least one of the plurality of UL resources. Operation 540 includes transmitting, by the UE, data using the at least one of the plurality of selected UL resources.

Example 2: According to an example implementation of Example 1, wherein the plurality of UL resources includes locations and size of a plurality of physical uplink shared channel (PUSCH) resources in time and frequency space by which data is to be transmitted to a base station (gNB).

Example 3: According to an example implementation of Examples 1 or 2, wherein the UL resource information includes a plurality of preambles to be transmitted over a physical random access channel (PRACH), and wherein selecting the at least one of the plurality of UL resources includes performing a random access channel (RACH) operation to produce a selected preamble and a mapping from the selected preamble to a PUSCH resource of the plurality of PUSCH resources.

Example 4: According to an example implementation of any of Examples 1-3, wherein the RACH operation is a four-step RACH operation.

Example 5: According to an example implementation of Example 1, wherein determining the restrictions on the UE resources associated with each of the plurality of UL resources includes performing a power determination operation to produce a value of a output power reduction associated with that UL resource.

Example 6: According to an example implementation of Example 1, wherein determining the restrictions on the UE resources associated with each of the plurality of UL resources includes performing a duty cycle determination operation to produce a value of a minimum duty cycle associated with that UL resource.

Example 7: According to an example implementation of Example 1, wherein the UL resource information is received with a plurality of downlink (DL) reference signals (RSs), each of the plurality of DL RSs being associated with a respective UL resource of the plurality of UL resources, wherein the method further comprises performing a power measurement operation on each of the plurality of DL RSs to produce a plurality of reference signal received power (RSRP) values, each of the plurality of RSRP values corresponding to a respective UL resource of the plurality of UL resources, and wherein selecting the at least one of the plurality of UL resources includes adjusting, for each of the plurality of DL RSs, the RSRP value of the plurality of RSRP values to produce an adjusted RSRP value corresponding to the RSRP value, the adjusted RSRP value being based on the restrictions on the UE resources.

Example 8: According to an example implementation of Examples 1 or 7, wherein selecting the at least one of the plurality of UL resources further includes selecting the UL resource of the plurality of UL resources for which the adjusted RSRP value corresponding to the UL resource is greater than a threshold value.

Example 9: According to an example implementation of any of Examples 1, 7, and 8, wherein the UL resource information received from the network further includes the threshold value.

Example 10: According to an example implementation of Examples 1 or 7, wherein the adjusted RSRP values corresponding to the plurality of UL resources are all less than the threshold value, and wherein performing the UL determination operation further includes selecting the UL resource of the plurality of UL resources for which a duty cycle associated with that UL resources is a maximum.

Example 11: According to an example implementation of Examples 1 or 7, wherein a subset of the adjusted RSRP values corresponding to a respective subset of the plurality of UL resources are greater than the threshold value, and wherein performing the UL determination operation further includes selecting the UL resource of the subset of the plurality of UL resources for which the value of a duty cycle associated with that UL resource is a maximum.

Example 12: According to an example implementation of Examples 1 or 7, wherein a subset of the adjusted RSRP values corresponding to a respective subset of the plurality of UL resources are greater than the threshold value, and wherein performing the UL determination operation further includes generating a priority ranking of the subset of the plurality of UL resources in descending order based on the value of a duty cycle associated with that UL resource.

Example 13: According to an example implementation of Examples 1 or 7, wherein the UE includes a plurality of antennae, each of the plurality of antennae corresponding to a beam through which a respective downlink reference signal of the plurality of downlink reference beams is delivered to that antennae.

Example 14: According to an example implementation of any of Examples 1, 7, and 13, wherein one of the restrictions on the UE resources is a maximum power reduction (MPR), and wherein the UL determination operation is performed in response to the UE exceeding a maximum power value determined from the MPR associated with at least one beam of the plurality of beams.

Example 15: According to an example implementation of any of Examples 1, 7, and 13, wherein the UL determination operation is performed in response to the UE having a value of a duty cycle less than a minimum duty cycle for at least one beam of the plurality of beams.

Example 16: According to an example implementation of any of Examples 1, 7, and 13, further comprising sending a message to the gNB, the message including an indication of at least one of the plurality of beams having a power value exceeding a maximum permissible emission (MPE).

Example 17: According to an example implementation of any of Examples 1, 7, 13, and 16, wherein the message is sent to the gNB within a Msg3 of a RACH procedure defined by the UL determination operation.

Example 18: According to an example implementation of Example 1, wherein selecting the at least one of the plurality of UL resources includes selecting the UL resource of the plurality of UL resources for which a value of a duty cycle corresponding to the UL resource is less than a threshold value.

Example 19: According to an example implementation of Examples 1 or 18, wherein the UL resource information received from the network further includes the threshold value.

Example 20: According to an example implementation of Examples 1 or 18, wherein one of the restrictions on the UE resources is a output power reduction, wherein values of duty cycles corresponding to the plurality of UL resources are all greater than the threshold value, and wherein performing the UL determination operation further includes selecting the UL resource of the plurality of UL resources for which the output power reduction associated with that UL resources is a minimum.

Example 21: According to an example implementation of Examples 1 or 18, wherein one of the restrictions on the UE resources is a output power reduction, wherein a subset of values of the duty cycle corresponding to a respective subset of the plurality of UL resources are less than the threshold value, and wherein performing the UL determination operation further includes selecting the UL resource of the subset of the plurality of UL resources for which the value of the MPR associated with that UL resource is a minimum.

Example 22: According to an example implementation of Examples 1 or 18, wherein one of the restrictions on the UE resources is a output power reduction, wherein a subset of values of the duty cycle corresponding to a respective subset of the plurality of UL resources are greater than the threshold value, and wherein performing the UL determination operation further includes generating a priority ranking of the subset of the plurality of UL resources in ascending order based on the value of the output power reduction associated with that UL resource.

Example 23: An apparatus comprising means for performing a method of any of examples 1-22.

Example 24: A computer program product including a non-transitory computer-readable storage medium and storing executable code that, when executed by at least one data processing apparatus, is configured to cause the at least one data processing apparatus to perform a method of any of claims 1-22.

Further example implementations and/or example details will now be provided.

List of Example Abbreviations

Figure 6:
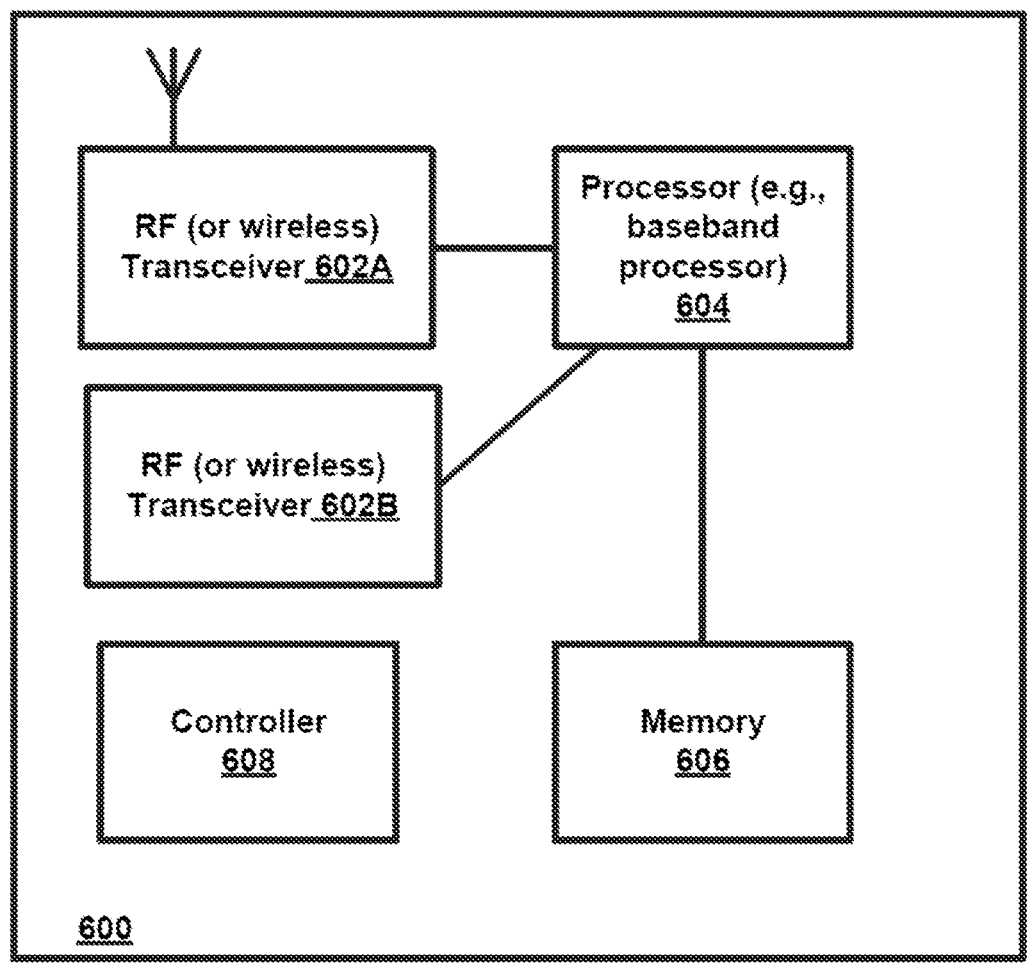
FIG. 6 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology
5GMM: 5GS mobility management
5GS: 5G system
5GSM: 5GS session management
ACB: access class barring
AMF: access and mobility management function
CSFB: circuit switched fallback
DM: device management
DN: data network
DNN: data network name
EHPLMN: equivalent HPLMN
eMBB: enhanced mobile broadband
eNB: evolved Node B
EPS: evolved packet system
gNB: next generation Node B (uncertain)
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management OMA: open mobile alliance
OS: operating system
PCF: policy control function
PDU: protocol data unit
PLMN public land mobile network
RAN: radio access network
RRC: radio resource control
S-NSSAI: single NSSAI
SD: slice differentiator
SMS: short message service
SMSoNAS: SMS over NAS
SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 6 is a block diagram of a wireless station (e.g., AP, BS, eNB, UE or user device) 1200 according to an example implementation. The wireless station 1200 may include, for example, one or two RF (radio frequency) or wireless transceivers 602A, 602B, where each wireless transceiver includes a transmitter to transmit signals and a receiver to receive signals. The wireless station also includes a processor or control unit/entity (controller) 604 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602 (602A or 602B). Processor 904 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 12, such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. An apparatus, comprising: at least one processor; and at least one memory including computer program code; the at least one memory and the computer program code configured to, with the at least one processor, cause the apparatus at least to:
receive uplink resource information from a network describing a plurality of uplink resources;
determine, after receiving the uplink resource information and for at least one of the plurality of uplink resources, restrictions on user equipment resources associated with the at least one of the plurality of uplink resources;
select at least one of the plurality of uplink resources based on the restrictions on user equipment resources associated with the at least one of the plurality of uplink resources; and
transmit data using the at least one of the plurality of selected uplink resources;
wherein the at least one memory and the computer program code, with the at least one processor, configured to select the at least one of the plurality of uplink resources is further configured to select the uplink resource of the plurality of uplink resources for which an adjusted reference signal received power value corresponding to the uplink resource is greater than a threshold value;
wherein the adjusted reference signal received power values corresponding to the plurality of uplink resources are all less than the threshold value, and
wherein the at least one memory and the computer program code, with the at least one processor, further configured to select the uplink resource of the plurality of uplink resources for which a duty cycle associated with that uplink resources is a maximum.

2. The apparatus of claim 1, wherein the plurality of uplink resources includes locations and sizes of a plurality of physical uplink shared channel resources in time and frequency space by which data is to be transmitted to a base station.

3. The apparatus of claim 1, wherein the uplink resource information includes a plurality of preambles to be transmitted over a physical random access channel, and
wherein the at least one memory and the computer program code, with the at least one processor, configured to select the at least one of the plurality of uplink resources is further configured to perform a random access channel operation to produce a selected preamble and a mapping from the selected preamble to a physical uplink shared channel resource of the plurality of physical uplink shared channel resources.

4. The apparatus of claim 1, wherein a random access channel operation is a four-step random access channel operation.

5. The apparatus of claim 1, wherein the at least one memory and the computer program code, with the at least one processor, configured to determine the restrictions on user equipment resources associated with at least one of the plurality of uplink resources is further configured to perform a power determination operation to produce a value of a output power reduction associated with that uplink resource.

6. The apparatus of claim 1, wherein the at least one memory and the computer program code, with the at least one processor, configured to determine the restrictions on the user equipment resources associated with at least one of the plurality of uplink resources is further configured to perform a duty cycle determination operation to produce a value of a minimum duty cycle associated with that uplink resource.

7. The apparatus of claim 1, wherein the uplink resource information is received with a plurality of downlink reference signals, each of the plurality of downlink reference signals being associated with a respective uplink resource of the plurality of uplink resources,
wherein the at least one memory and the computer program code, with the at least one processor, is further configured to perform a power measurement operation on each of the plurality of downlink reference signals to produce a plurality of reference signal received power values, each of the plurality of reference signal received power values corresponding to a respective uplink resource of the plurality of uplink-resources, and
wherein the at least one memory and the computer program code, with the at least one processor, configured to select the at least one of the plurality of uplink resources is further configured to:
adjust, for each of the plurality of downlink reference signals, the reference signal received power value of the plurality of reference signal received power values to produce an adjusted reference signal received power value corresponding to the reference signal received power value, the adjusted reference signal received power-value being based on the restrictions on the user equipment resources.

8. The apparatus of claim 1, wherein the uplink resource information received from the network further includes the threshold value.

9. The apparatus of claim 1, wherein the user equipment includes a plurality of antennae, each of the plurality of antennae corresponding to a beam through which a respective downlink reference signal of a plurality of downlink reference beams is delivered to that antennae.

10. The apparatus of claim 9, wherein one of the restrictions on the user equipment resources is an output power reduction, and
wherein the determining of the restrictions on user equipment resources associated with at least one of the plurality of uplink resources is performed in response to the user equipment exceeding a maximum power value determined from the output power reduction associated with at least one beam of the plurality of beams.

11. The apparatus of claim 9, wherein the determining of restrictions on the user equipment resources associated with at least one of the plurality of uplink resources is performed in response to the user equipment having a value of a duty cycle less than a minimum duty cycle for at least one beam of the plurality of beams.

12. The apparatus of claim 9, wherein the at least one memory and the computer program code, with the at least one processor, further configured to send a message to a base station, the message including an indication of at least one of the plurality of beams having a power value exceeding a maximum permissible emission.

13. The apparatus of claim 12, wherein the message is sent to the base station within a Msg3 of a random access channel procedure.

14. The apparatus of claim 1, wherein the at least one memory and the computer program code, with the at least one processor, configured to select the at least one of the plurality of uplink resources, is further configured to select the uplink resource of the plurality of uplink resources for which a value of a duty cycle corresponding to the uplink resource is less than a threshold value.

15. An apparatus, comprising: at least one processor; and at least one memory including computer program code; the at least one memory and the computer program code configured to, with the at least one processor, cause the apparatus at least to:
receive uplink resource information from a network describing a plurality of uplink resources;
determine, after receiving the uplink resource information and for at least one of the plurality of uplink resources, restrictions on user equipment resources associated with the at least one of the plurality of uplink resources;
select at least one of the plurality of uplink resources based on the restrictions on user equipment resources associated with the at least one of the plurality of uplink resources; and
transmit data using the at least one of the plurality of selected uplink resources;
wherein a subset of an adjusted reference signal received power values corresponding to a respective subset of the plurality of uplink resources are greater than the threshold value, and
wherein the at least one memory and the computer program code, with the at least one processor, further configured to select the uplink resource of the subset of the plurality of uplink resources for which the value of a duty cycle associated with that uplink resource is a maximum;
wherein the at least one memory and the computer program code, with the at least one processor, configured to select the at least one of the plurality of uplink resources is further configured to select the uplink resource of the plurality of uplink resources for which an adjusted reference signal received power value corresponding to the uplink resource is greater than a threshold value.

16. An apparatus, comprising: at least one processor; and at least one memory including computer program code; the at least one memory and the computer program code configured to, with the at least one processor, cause the apparatus at least to:
receive uplink resource information from a network describing a plurality of uplink resources;
determine, after receiving the uplink resource information and for at least one of the plurality of uplink resources, restrictions on user equipment resources associated with the at least one of the plurality of uplink resources;

select at least one of the plurality of uplink resources based on the restrictions on user equipment resources associated with the at least one of the plurality of uplink resources; and transmit data using the at least one of the plurality of selected uplink resources;

wherein a subset of an adjusted reference signal received power values corresponding to a respective subset of the plurality of uplink resources are greater than the threshold value, and wherein the at least one memory and the computer program code, with the at least one processor, further configured to generate a priority ranking of the subset of the plurality of uplink resources in descending order based on a value of a duty cycle associated with that uplink resource;

wherein the at least one memory and the computer program code, with the at least one processor, configured to select the at least one of the plurality of uplink resources is further configured to select the uplink resource of the plurality of uplink resources for which an adjusted reference signal received power value corresponding to the uplink resource is greater than a threshold value.

* * * * *